March 6, 1945.  A. H. OELKERS  2,371,108
BRAKE ARRANGEMENT
Filed Oct. 19, 1940  3 Sheets-Sheet 1
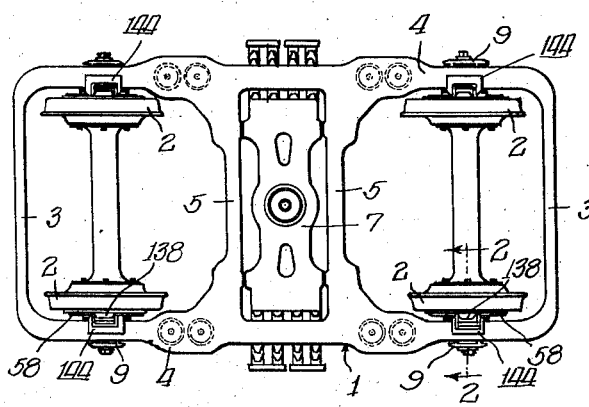
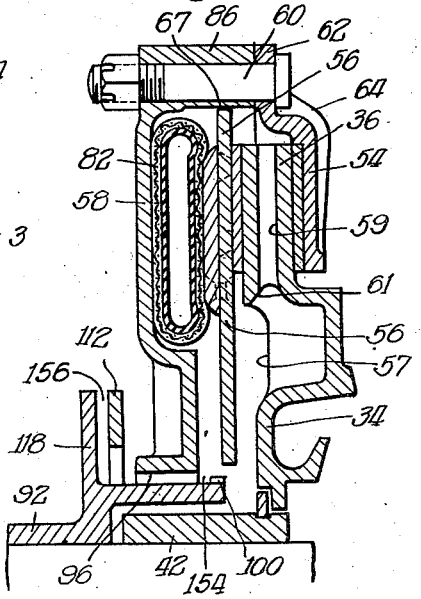
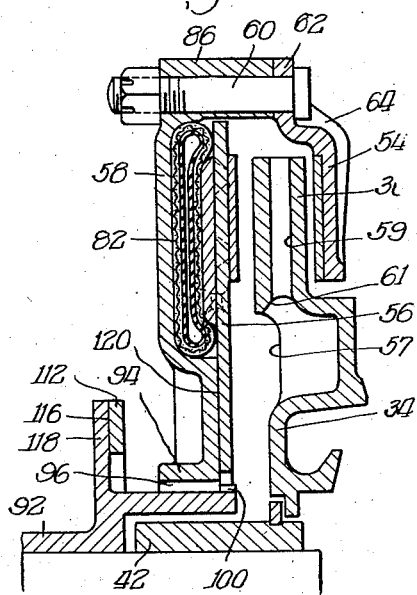
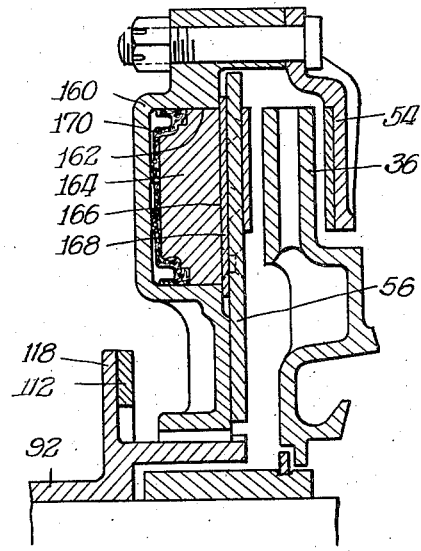
INVENTOR.
Alfred H. Oelkers,
BY
attij

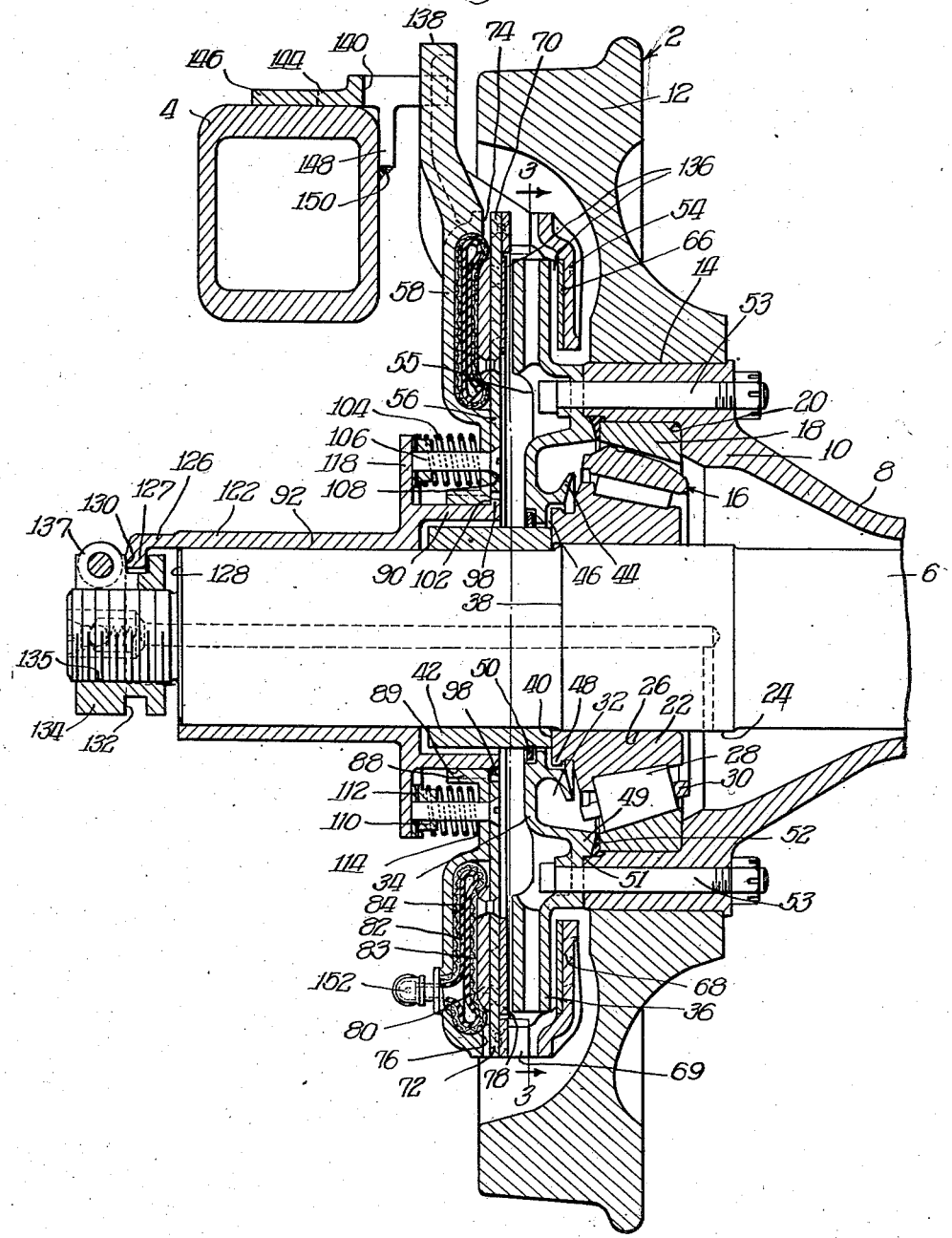

March 6, 1945. A. H. OELKERS 2,371,108
BRAKE ARRANGEMENT
Filed Oct. 19, 1940 3 Sheets-Sheet 3

INVENTOR.
Alfred H. Oelkers,
BY
ATTY.

Patented Mar. 6, 1945

2,371,108

UNITED STATES PATENT OFFICE 2,371,108

BRAKE ARRANGEMENT

Alfred H. Oelkers, Chicago, Ill., assignor to American Steel Foundries, Chicago, Ill., a corporation of New Jersey Application October 19, 1940, Serial No. 361,847

34 Claims. (Cl. 188—153)

My invention relates to a brake arrangement and more particularly to a disc brake having braking means and operable means therefor supported on a wheel and axle assembly.

An object of my invention is to design a disc brake wherein braking means and operable means therefor are supported between the wheel of a railway wheel and axle assembly and a frame member of a railway truck frame.

My invention contemplates such a disc brake wherein a rotating brake element may be frictionally engaged on opposite sides by nonrotating elements which are axially movable in opposite directions with relation to the supporting axle.

A further object of my invention is to slidably support power means for such a disc brake so that upon actuation thereof stationary braking elements supported from said power means will be moved in opposite directions and frictionally engage opposite sides of a rotatable braking element mounted therebetween.

A more specific object of my invention is to movably support a housing for the power means of such a disc brake on a nonrotating axle and to support from said housing a plurality of stators, one of said stators being rigidly fixed to said housing and the other of said stators being axially movable with relation to said housing.

Another object of my invention is to design a disc brake having a plurality of stators with a rotor therebetween wherein means are provided on an end of an axle for equalizing the clearance between the stators and the rotor when the stators are in their released positions.

A different object of my invention is to mount operating means for such a disc type brake on an axle in such manner that forces actuating said brake will be contained within the brake structure and the supporting wheel and axle assembly will be substantially free of stresses caused thereby.

My invention comprehends such a disc type brake wherein the reaction of actuating forces serves to apply one of said stators to the rotor for frictional engagement.

Another object of my invention is to afford a novel arrangement for transmitting torque developed in such a disc brake to the truck frame.

Referring to the drawings,

Figure 1 is a top plan view of a railway car truck embodying my novel braking means.

Figure 2 is a fragmentary sectional view of a wheel and axle assembly shown in Figure 1, the section being taken substantially in a vertical transverse plane bisecting the assembly as indicated by the line 2—2 of Figure 1.

Figure 5 is a fragmentary sectional view of the braking means in Figure 1 in their applied position, the section being taken substantially in the transverse planes indicated by line 5—5 of Figure 3.

Figure 6 is a fragmentary sectional view of said braking means in released position, the section being taken substantially in the same planes as that of Figure 5.

Figure 7 is a fragmentary sectional view showing a ring cylinder adapted to actuate my novel braking means, the section being taken substantially in the same planes as that of Figure 5.

Figure 3:
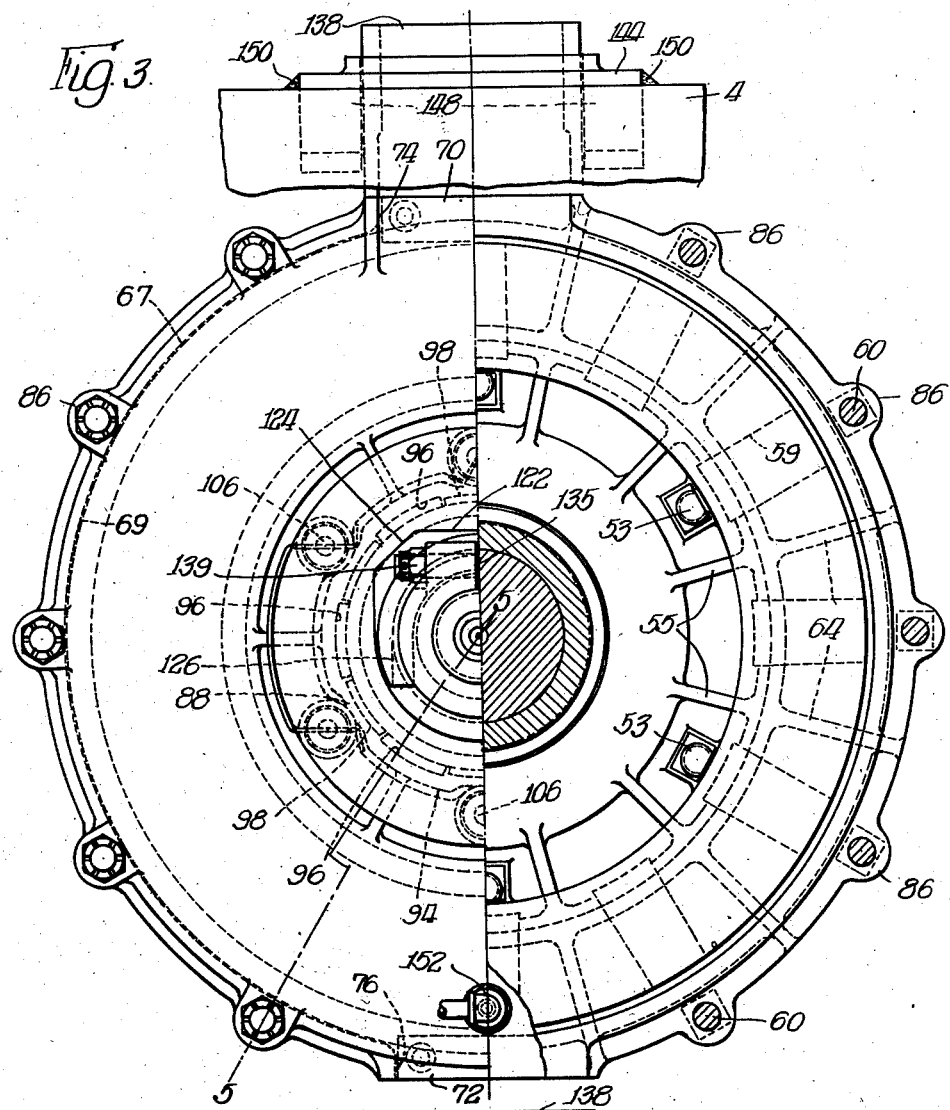
Figure 3 is a fragmentary end view of the structure shown in Figure 1, the right half thereof being a sectional view taken substantially in the planes indicated by lines 3—3 of Figure 2.
Figure 4:
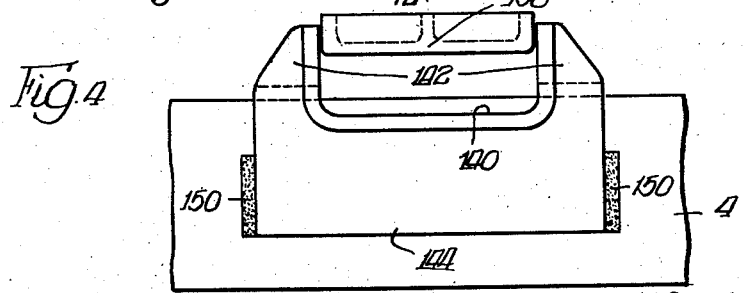
Figure 4 is a fragmentary top view of the structure in Figure 3, showing my novel means of transmitting torque to the truck frame.

Describing my invention in greater detail, a conventional railway car truck frame generally indicated at 1 (Figure 1) is supported from spaced wheel and axle assemblies 2, 2 and comprises longitudinal side members 4, 4 and transverse end and intermediate members 3, 3 and 5, 5 respectively. A bolster 7 may be supported between the intermediate transverse members 5, 5 by spring means in well-known manner and journal means 9, 9 afford a connection between the wheel and axle assemblies and the truck frame.

Each wheel and axle assembly 2 (Figure 2) may comprise a normally non-rotating inner axle 6 sleeved within an outer rotating axle or housing 8 having a bell-like end 10 on which a wheel 12 may be press-fitted as at 14. Between the inner and outer axles may be an antifriction bearing generally indicated at 16 comprising an outer race or cup 18 fitted in said bell-like end 10 as at 20, an inner race or cone 22 fitted on a raised bearing portion 24 on the nonrotating axle 6 as at 26, and a series of rollers 28, 28 held in normal spaced relationship by a cage 30. A cover for the lubricant cavity 32 may be afforded by a closure plate 34 formed integrally with a rotating brake element or rotor 36. The outboard end of the inner race 22 extends slightly beyond a shoulder 38 defining the outboard end of the raised bearing portion 24 and is afforded abutment as at 40 with a shrink collar 42 on the inner nonrotating axle for positioning the antifriction bearing 16. Escape of lubricant from the cavity 32 may be substantially prevented by an inboardly directed annular oil deflector 44 on the closure plate 34, and the labyrinthine passage 46 formed by the pulling shoulder 48 on said inner race 22 and the baffle ring 50 snapped on the collar 42. An annular gasket 52 of suitable material may be interposed between the closure plate and the outer race 18.

The closure plate 34 has an annular shoulder 49 affording an accurate seat as at 51 for said plate against the outboard face of the bell-like end of the outer axle 8, and said integrally formed plate and rotor may be secured to said axle by spaced nut and bolt assemblies 53, 53 passing through the bell-like end 10 of the outer axle 8. Radial reinforcing ribs 55, 55 extend between the rotor 36 and the closure plate 34 and may be relieved as at 57 (Figure 6). Spaced radial slots 59, 59 extends through the rotor 36 and an annular groove 61 may be formed at the inner periphery of said rotor to guide excess or waste lubricant which might escape from the bearing cavity into the radial slots 59, 59 and away from the braking surfaces on the rotor. It is apparent that when the wheel and axle assembly is stationary, excess lubricant will follow the outboard face of the closure plate into groove 61 by gravity and downwardly through one of the slots 59, 59. When the wheel and axle assembly is rotating, any excess lubricant will be centrifugally thrown outward along the outboard face of the closure plate into the groove 61 and then outward through the slots 59, 59. The radial slots 59, 59 also afford air cooling means for the rotor 36.

In addition to the rotor 36, my novel braking means includes inboard and outboard nonrotating annular brake elements or stators 54 and 56 disposed on opposite sides of said rotor for clamping or squeezing said rotor in frictional engagement. The inboard stator 54 may be positioned between the wheel 12 and the rotor 36 and may be secured to an anular housing 58 in any convenient manner as by nut and bolt assemblies 60, 60 spaced around outer circumferential portions of said housing as best seen in Figures 3 and 5. The stator 54 comprises a movable steel disc having an offset annular flange 62 adjacent its outer circumference with spaced radial reinforcing ribs 64, 64 on its inboard face. Wear plates 66, 66 may be secured to the outboard face of said stator in any convenient manner such as by fusing braking metal to said disc and interlocking said metal therewith as at 68, 68.

The outboard stator 56 may be supported from the housing 58 for relative axial movement therewith and is afforded a sliding fit as at 67 (Figures 2 and 5) with the inner surfaces of an inwardly extending circumferential flange 69 formed around the outer periphery of the housing 58. The stator 56 may be held against rotation by top and bottom lugs 70 and 72 received within transverse slots 74 and 76 in the top and bottom of said housing respectively. The stator 56 includes an annular steel disc having on its inboard face spaced wear plates 78, 78 of suitable friction material shown here as braking metal fused to the steel disc and interlocked therewith. On its outboard face said stator 56 may have secured thereto in any convenient manner, as by counter-sunk rivets, insulating material 80 for reducing to a minimum the transmission of heat generated by braking to the annular pneumatic tube 82 serving as actuating means for the braking means.

The pneumatic tube 82 abuts said insulating material 80 as at 83 and may be seated within an annular channel or recess 84 formed in the housing 58. The housing 58 may have formed around its outer circumference inboardly extending spaced lugs 86, 86 (Figures 3 and 6) to which the inboard stator 54 is tightly secured by the nut and bolt assemblies 60, 60 extending through the lugs 86, 86. Around the inner perimeter of the housing 58 may be formed spaced outboardly extending flanges 88, 88 having sliding engagement as at 89 with an annular flange 90 on a mounting sleeve 92. Alternating with the flanges 88, 88 may be the radially outwardly spaced flanges 94, 94 (Figure 6) defining with the flanges 88, 88 spaced slots 96, 96 in the inner perimeter of the housing 58. The annular flange 90 is spaced from the inner axle to afford clearance for the collar 42 and adjacent the inboard end of said flange may be formed radially spaced outwardly projecting lugs 98, 98 defining therebetween spaced slots 100, 100. The slots 96, 96 on the housing and the slots 100, 100 on the sleeve are complementary to the lugs 98, 98 on the sleeve and the flanges 88, 88 on the housing respectively, said slots 96, 96 and 100, 100 accommodating the passage therethrough of the respective lugs and flanges during assembly. In assembling the housing 58 on the sleeve 92, the spaced slots 96, 96 on the housing may be aligned with the spaced lugs 98, 98 on the flange 90 and the housing slipped over the flange 90. The housing 58 may then be rotated through approximately 45 degrees until the flanges 88, 88 are aligned with the lugs 98, 98 on said flange for abutment therewith as at 102 when the braking means are in normal released position to prevent disassembly of the housing with the sleeve 92.

Release means for the stators may be afforded by the release springs 104, 104 sleeved over screw bolts 106, 106 radially spaced around the inner peripheral areas of the cylinder housing 58 and outboard stator 70. Each bolt 106 has its head counter-sunk in the outboard stator 56 as at 108 and extends through the cylinder housing for threaded engagement with a stud 110 on a spring retainer ring 112 spaced outboardly from said housing. The spaced studs 110, 110 afford positioning means for the outboard ends of the release springs 104, 104 seated against said ring 112 and the inboard ends of the release springs 104, 104 may be seated against the housing 58 as at 114, 114. When the stators are in released position the spring retainer ring 112 may have abutment as at 116 (Figure 6) with a radially extending flange 118 on the sleeve 92, and the springs 104, 104 may be precompressed to press the inboard face of the housing 58 into abutment as at 120 with the outboard stator 56.

The mounting sleeve 92 on the projecting end of the inner axle 6 may be formed of suitable antifriction material such as bronze, and permits some creeping of the normally non-rotating axle 6. It is apparent that in the event of failure of the bearings 16, the sleeve 92 will afford emergency rotation of the normally nonrotating axle 6. The sleeve may be afforded a flat top surface 122 with a beveled edge 124 along each side thereof, and at its outboard end may be formed a generally inverted U-shaped flange 126 extending outwardly beyond the shoulder 128 on the end portion of the inner axle 6. The radially inwardly projecting portion 127 of the flange 126 has tongue and groove engagement as at 130 with an annular recess or channel 132 formed on an adjusting nut 134 threaded at 135 on the end portion of the inner axle 6. The adjusting nut 134 may be partially split at 135 and has spaced lugs 137, 137 through which a retaining nut and bolt 139 may extend for tightly locking said nut on the inner axle 6 after running clearances at 136, 136 between the stators and the rotor have been finally adjusted.

It will be apparent that the running clearances 136, 136 must be equalized to afford uniform and effective application of the stators 54 and 56 against the rotor 36. To equalize and maintain said clearances the height of springs 104, 104 may be adjusted by the screw bolts 106, 106 so that the lugs 88, 88 on the housing 58 are afforded abutment as at 102 with the lugs 98, 98 on the sleeve 92 when the spring retainer ring 110 has abutment with the flange 118 on said sleeve. The stator 56 has abutment with the housing 58 at 120 as afore-described. It is thus apparent that in release the stators are fixed in position wtih relation to each other and to the sleeve 92. Rotation of the adjusting nut 134 will move the sleeve inboardly or outboardly by means of the tongue and groove engagement at 130, and since the stators are fixed as aforedescribed, they will simultaneously be moved inboardly or outboardly with respect to the rotor 36. Clearances 136, 136 may thus be easily adjusted and equalized.

Torque forces may be transmitted to the truck frame through an upwardly projecting arm 138 formed on the top of the housing 58 and extending within the opening 140 defined by the jaws 142, 142 on the bracket 144. The jaw bracket 144 includes a flat member 146 seated on top of the side member 4 and spaced downwardly projecting arms 148, 148 seated on the inboard side of said side member, said bracket being secured in any convenient manner to the frame member 4 as by welding at 150, 150. Axial movement of the housing 58 is permitted by the arm 138 sliding within the jaw bracket 144.

In operation, actuating fluid may be injected into the pneumatic tube at 152 causing the tube to expand and to push apart the outboard stator 56 and the housing 58. The stators 54 and 56 are thus simultaneously moved in opposite directions toward each other and clamp or squeeze opposite faces of the rotor 36. The brake is shown in applied position in Figure 5, wherein it may be noted that the housing 58 is spaced outboardly as at 154 from its abutment with lugs 98, 98 on the sleeve and the outboard stator has been moved inboardly, said stator 56 carrying with it the spring retainer ring 112 to the spaced position from flange 118 as at 156. It is apparent that the spaces 154 and 156 are equal to the clearances at 136, 136 between the rotor and the stators.

Outboard movement of the housing 58 and inboard movement of the retainer ring 112 further compresses the springs 104, 104 therebtween, and upon release of the power means the springs 194, 194 return the stators, housing, and retainer ring to their normal released position.

In the modification shown in Figure 7 the braking means are substantially identical with those afore-described with the exception that the actuating means is of ring cylinder type rather than the pneumatic air tube 82 previously described. A housing 160 is generally similar to the housing 58 and includes an annular chamber 162 within which may be received an annular piston 164 having abutment as at 166 with insulating material 168 secured in any convenient manner to the outboard stator 56. A piston packing ring 170 may be secured to the pressure face of the piston 164 and affords a seal for the pressure chamber between the piston and the housing 160. Operation of the ring cylinder is substantially similar to that of the pneumatic tube, the injection of air into the pressure chamber pushing apart the housing 160 and piston 164 for simultaneous application of the stators against the rotor.

It will be understood by those skilled in the are that I have devised a novel braking arrangement wherein the forces actuating the stators are contained wholly within the brake structure and are not transmitted to the wheel and axle assembly. In other words, upon application of the power means, the reaction of the actuating force urges the inboard stator 54 against the rotor 36, and neither the outer axle nor the inner axle is stressed in tension or compression by reason of said application.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a vehicle, a frame member, a supporting wheel and axle assembly comprising an outer axle having a wheel thereon and an inner axle having a journal end projecting outwardly of said wheel, an antifriction bearing between said axles and a collar on said inner axle maintaining said bearing in assembled relationship, a sleeve adjustably seated on said journal end and spaced from said collar, a housing mounted on said sleeve and having a plurality of stators supported therefrom, one of said stators being secured to said housing, and another of said stators being axially movable with respect to said housing, a rotor supported from said rotating axle between said stators, operable means on said housing for moving said stators into frictional engagement with said rotor, and release means for said stators associated with said housing and said axially movable stator.

2. In a vehicle, a frame member, a supporting wheel and axle assembly comprising a normally rotating axle having a wheel thereon and a normally nonrotating axle sleeved within said rotating axle and having a journal end projecting outwardly of said wheel, an antifriction bearing between said axles, means on said nonrotating axle maintaining said bearing in assembled relationship, a housing slidably mounted on said journal end and having a plurality of stators supported therefrom, said housing being spaced from said means, one of said stators being secured to said housing and another of said stators being axially movable with respect to said housing, a rotor supported from said rotating axle between said stators, and operable means on said housing for moving said stators into frictional engagement with said rotor.

3. In a vehicle, a frame member, a supporting wheel and axle assembly including inner and outer axles and a wheel, an antifriction bearing between said axles, means on the inner axle for maintaining said bearing in assembled relationship, a housing on one of said axles and having a plurality of stators supported therefrom, said housing being spaced from said means, certain of said stators being fixed to said housing, a rotor supported from the other of said axles, power means on said housing for moving said stators into engagement with opposite sides of said rotor, and means for adjusting relative positions of said stators with respect to said rotor.

4. In a vehicle, a frame member, a supporting wheel and axle assembly including rotating and nonrotating axles, an antifriction bearing between said axles, and a collar on the nonrotating axle in abutment with said bearing for maintaining the same in assembled relationship, a wheel on said rotating axle, rotor means supported from said rotating axle, a housing slidably mounted on said nonrotating axle, and spaced from said collar, stator means supported from said housing, and operable means on said housing for bringing said stator means into frictional engagement with opposite sides of said rotor means.

5. In a brake arrangement, a wheel and axle assembly comprising inner and outer axles and an antifriction bearing therebetween, means on said inner axle for maintaining said bearing in position, support means slidably positioned on the end of said inner axle and spaced from the first-mentioned means, rotor means driven by the outer axle, stator and power means supported from said support means, and means for adjustably positioning said support means on said inner axle.

6. In a brake arrangement, a wheel and axle assembly comprising inner and outer axles and an antifriction bearing therebetween, a collar on said inner axle for maintaining said bearing in assembled position, support means slidably positioned on the end of said inner axle and spaced from said collar, rotor means driven by the outer axle, stator and power means supported from said support means, and means for adjustably positioning said support means on said inner axle, said last-mentioned means comprising a member adapted to restrain said support means against movement in either direction axially of said asssembly.

7. In a brake arrangement, a wheel and axle assembly comprising inner and outer axles and an antifriction bearing therebetween, a collar on the inner axle for maintaining said bearing in assembled position, support means spaced from said collar and slidably positioned on said inner axle, rotor means driven by the outer axle, stator and power means supported from said support means, and a member threaded on said inner axle and in slidable tongue and groove engagement with said support means.

8. In a brake arrangement, a wheel and axle assembly comprising inner and outer axles and an antifriction bearing, support means slidably positioned on said inner axle and spaced from said bearing, rotor means driven by the outer axle, stator means mounted on said support means, power means for urging said rotor and stator means into frictional engagement, and means for adjustably positioning said support means on said inner axle.

9. In a brake arrangement, a wheel and axle assembly comprising inner and outer axles and a wheel on said outer axle, antifriction means between said wheels, a stator support member spaced from said means and movably mounted on said inner axle, a stator on said member, a rotor driven by said wheel, power means for urging said stator and rotor into frictional engagement, means for adjustably positioning said member on said inner axle, and torque means associated with said member for preventing rotation thereof, said adjusting means comprising a member threaded on said inner axle in tongue and groove engagement with said support member.

10. In a brake arrangement, a wheel and axle assembly comprising rotating and nonrotating axles and a wheel on said rotating axle, antifriction means between said axles, a stator support member spaced from said means and movably mounted on said nonrotating axle for movement therealong toward and away from said wheel, a stator carried by said member, a rotor driven by said wheel, actuating means for urging said rotor and stator into frictional engagement, means for adjustably positioning said member on said nonrotating axle, and torque means associated with said member for preventing rotation thereof.

11. In a vehicle, a frame, a supporting wheel and axle assembly including rotating and nonrotating axles, a wheel on said rotating axle, rotor means supported from said rotating axle, a member slidably mounted on said non-rotating axle outwardly of said wheel, stator means supported from said member, operable means on said member for bringing said stator means into frictional engagement with opposite sides of said rotor means, and a torque arm on said operable means having slidable abutment with means on said frame.

12. In a vehicle, a frame, a wheel and axle assembly comprising inner and outer axles and a wheel, a rotatable braking element supported from said outer axle, a housing slidably mounted on said inner axle outwardly of said wheel, nonrotatable braking elements supported on opposite sides of said rotatable element from said housing, operable means on said housing for moving certain of said non-rotatable elements into engagement with said rotatable element, and a torque arm on said housing having slidable abutment in opposite directions with means on said frame.

13. In a vehicle, a frame member, a supporting wheel and axle assembly including inner and outer axles and a wheel, a housing on one of said axles having a plurality of stators supported therefrom, certain of said stators being fixed to said housing, a rotor supported from the other of said axles, power means on said housing for moving said stators into engagement with opposite sides of said rotor, and a torque arm on said housing having slidable abutment with means on said frame.

14. In a brake arrangement, a frame, a supporting wheel and axle assembly including rotating and nonrotating axles and a wheel on said rotating axle, rotor means supported from said rotating axle, a member mounted on said nonrotating axle and movable therealong toward and away from said wheel, stator means supported from said member, operating means for moving said member along said nonrotating axle and thereby urging said stator means into engagement with said rotor means, and a torque arm on said member having slidable abutment with means on said frame.

15. In a vehicle, a frame, a supporting wheel and axle assembly including inner and outer axles and a wheel, a member movably mounted on one of said axles, a stator rigidly secured to said member, another stator movably mounted on said member, release springs abutting the outboard side of said member and connected to said last-mentioned stator, a rotor supported from the other of said axles between said stators, and power means associated with said member for frictionally engaging said rotor and stators, each of said springs being operable to move said stators away from each other.

16. In a brake arrangement, a wheel and axle assembly comprising inner and outer axles and a wheel on said outer axle, antifriction means between said axles, a stator support member spaced from said means and mounted on said inner axle for movement therealong toward and away from said wheel, a stator on said member, a rotor driven by said wheel, actuating means for urging said stator and rotor into frictional engagement, means for adjustably positioning said member on said inner axle, and torque means associated with said member for preventing rotation thereof.

17. In a vehicle, a frame, a supporting wheel and axle assembly including inner and outer axles and a wheel, a member slidably mounted on one of said axles, a stator immovably fixed to said member, another stator movably mounted on said member, compression springs supported against the outboard side of said member and connected to said last-mentioned stator, a rotor supported from the other of said axles between said stators, and power means associated with said member for frictionally engaging said rotor and stators, said springs serving as release means for both of said stators.

18. In a vehicle, a frame, a supporting wheel and axle assembly including rotating and nonrotating axles, a wheel on said rotating axle, an annular member slidably mounted on said nonrotating axle, rotor means supported from said rotating axle, stator means supported from said member, operable means on said member for bringing said stator means into frictional engagement with opposite sides of said rotor means, and a torque arm having a plurality of slidable abutments with said frame.

19. In a brake arrangement, a wheel and axle assembly comprising inner and outer axles and an antifriction bearing therebetween, means on said inner axle for maintaining said bearing in assembled position, support means slidably positioned on the end of said inner axle and spaced from the first-mentioned means, rotor means driven by the outer axle, spaced stator means movably mounted on said support means and disposed at opposite sides of said rotor means for clamping engagement therewith, power means for urging said rotor and stator means into said engagement, and a plurality of resilient release means mounted on one face of said support means and each reacting against respective stator means to move said stator means away from each other and out of engagement with said rotor means.

20. In a brake arrangement, a wheel and axle assembly comprising rotating and nonrotating axles in sleeved relationship with an antifriction bearing therebetween, means on the nonrotating axle for maintaining said bearing in assembled relationship, rotor means driven by the rotating axle, a support member in slidable sleeved relationship with the nonrotating axle, said support member being spaced from said maintaining means, stator means on said support member, power means for engaging said rotor and stator means, and means on the nonrotating axle for adjustably securing said support member against axial movement in either direction with respect to said assembly.

21. In a brake arrangement, a wheel and axle assembly comprising an outer axle, a wheel thereon, an inner axle having a journal end projecting outwardly of said wheel, bearings between said axles, a cover plate for said bearings secured on said outer axle, said cover plate having an annular flange defining its outer perimeter and forming a rotor with radial slots, stator supporting means slidably and adjustably mounted on said journal end, stators mounted on said supporting means at opposite sides of said rotor, and power means on said supporting means for moving said stators in reverse directions for engagement with said rotor.

22. In a brake arrangement, a wheel and axle assembly comprising an outer axle, a wheel thereon, an inner axle having a journal end projecting outwardly of said wheel, bearings between said axles, a cover plate for said bearings secured on said outer axle, said cover plate having an annular flange defining its outer perimeter and forming a rotor having radial passages therethrough, stator supporting means slidably and adjustably mounted on said journal end, stators mounted on said supporting means at opposite sides of said rotor, and power means on said supporting means for moving said stators in reverse directions for engagement with said rotor, said power means comprising a pneumatic tube recessed in said supporting means.

23. In a brake arrangement for a wheel and axle assembly, an outer axle, a wheel thereon, an inner axle having a journal end projecting beyond said wheel, a bearing cavity between said axles, bearings therein, a cover plate for said cavity having an annular flange in the form of a brake rotor, a sleeve adjustably mounted on said journal end, a housing slidably mounted on said sleeve, stators supported at opposite sides of said rotor from said housing, and power means in said housing for clamping said stators on said rotor.

24. In a brake arrangement for a wheel and axle assembly, an outer axle, a wheel thereon, an inner axle having a journal end projecting beyond said wheel, a bearing cavity between said axles, bearings therein, a cover plate for said cavity having an annular flange in the form of a brake rotor, a sleeve adjustably mounted on said journal end, a housing slidably mounted on said sleeve, stators supported at opposite sides of said rotor from said housing, power means in said housing for clamping said stators on said rotor, said cover plate having an annular recess radially inwardly of said rotor for capturing excess oil, and radial passageways in said rotor affording escape of said oil.

25. In a brake arrangement, a wheel and axle assembly comprising rotating and nonrotating axles and a wheel on said rotating axle, antifriction means between said axles, a stator support member spaced from said means and movably mounted on said nonrotating axle for movement therealong toward and away from said wheel, a stator carried by said member, a rotor driven by said wheel, actuating means for urging said rotor and stator into frictional engagement, means for adjustably positioning said member on said nonrotating axle, and torque means associated with said member for preventing rotation thereof, said adjusting means comprising a member threaded on said nonrotating axle in tongue and groove engagement with said support member.

26. In a roller bearing wheel and axle assembly, an outer axle, a wheel thereon, an inner axle having a journal end projecting beyond said wheel and defining with said outer axle a bearing cavity, bearings between said axles in said cavity, a cover plate for said cavity fixed on said outer axle and having integral means in the form of an annular flange defining a brake rotor with braking surfaces on the inboard and outboard faces thereof, and radial slots in said rotor affording passage for a cooling medium and deflecting excess lubricant from said braking surfaces.

27. In a brake arrangement for a railway wheel and axle, an outer axle, a wheel thereon, an inner axle having a journal end projecting beyond said wheel and defining with said outer axle a bearing cavity, bearings between said axles, a cover plate for said cavity fixed on said outer axle and having an annular flange about its outer perimeter defining a brake rotor with braking surfaces at opposite sides thereof, a sleeve adjustably mounted on said journal end, a stator supporting member slidably mounted on said sleeve and carrying stators arranged for engagement with opposite faces of said rotor, and power means on said stator supporting member operable to move said stators in reverse directions for engagement with said rotor.

28. In a brake arrangement for a railway wheel and axle assembly, an outer axle having a wheel, an inner axle having a journal end projecting outwardly of said wheel, a bearing cavity between said axles and a cover plate therefor, a brake rotor integral with said cover plate and presenting inboard and outboard braking surfaces, a member adjustably sleeved over said journal end, stator support means slidably mounted on said sleeve, stators mounted on said support means at opposite sides of said rotor, and power means on said support means operable to move said stators in reverse directions for engagement with said rotor.

29. In a brake arrangement for a railway wheel and axle assembly, an outer axle having a wheel, an inner axle having a journal end projecting outwardly of said wheel, a bearing cavity between said axles and a cover plate therefor, a brake rotor integral with said cover plate and presenting inboard and outboard braking surfaces, a member adjustably sleeved over said journal end, stator support means slidably mounted on said sleeve, stators mounted on said support means at opposite sides of said rotor, power means on said support means operable to move said stators in reverse directions for engagement with said rotor, and release means on said support means for said stators.

30. In a brake arrangement for a railway wheel and axle assembly, a truck frame, an outer axle, a wheel thereon, an inner axle having a journal end projecting beyond said wheel, bearings in a cavity between the axles, a cover plate for said cavity, a brake rotor integrally formed with said cover plate and presenting inboard and outboard braking surfaces, a sleeve adjustably mounted on said journal end, a stator carrier slidably mounted on said sleeve and supporting stators at opposite sides of said rotor, and power means in said carrier for moving said stators in reverse directions for engagement with said rotor.

31. In a brake arrangement for a railway wheel and axle assembly, a truck frame, an outer axle, a wheel thereon, an inner axle having a journal end projecting beyond said wheel, bearings in a cavity between the axles, a cover plate for said cavity, a brake rotor integrally formed with said cover plate and presenting inboard and outboard braking surfaces, a sleeve adjustably mounted on said journal end, a stator carrier slidably mounted on said sleeve and supporting stators at opposite sides of said rotor, power means in said carrier for moving said stators in reverse directions for engagement with said rotor, and a torque arm on said carrier having slidable abutment with means on said frame.

32. In a brake arrangement for a railway wheel and axle assembly, a truck frame, an outer axle, a wheel thereon, an inner axle having a journal end projecting beyond said wheel, bearings in a cavity between the axles, a cover plate for said cavity, a brake rotor integrally formed with said cover plate and presenting inboard and outboard braking surfaces, a sleeve adjustably mounted on said journal end, a stator carrier slidably mounted on said sleeve and supporting stators at opposite sides of said rotor, power means in said carrier for moving said stators in reverse directions for engagement with said rotor, and a torque arm on said carrier having slidable abutment in reverse directions with means on said frame.

33. In a brake arrangement, a wheel and axle assembly comprising rotating and nonrotating axles in sleeved relationship with an antifriction bearing therebetween, means on the nonrotating axle for maintaining said bearing in assembled relationship, rotor means driven by the rotating axle, a support member in slidable sleeved relationship with the nonrotating axle, said support member being spaced from said maintaining means, stator means on said support member, power means for engaging said rotor and stator means, and means on the nonrotating axle for adjustably securing said support member against axial movement in either direction with respect to said assembly, said last-mentioned means comprising a nut in threaded engagement with the end of said nonrotating axle and in slidable tongue and groove engagement with the support member.

34. In a brake arrangement, a frame, a supporting wheel and axle assembly including rotating and nonrotating axles and a wheel on said rotating axle, rotor means supported from said rotating axle, a member mounted on said nonrotating axle and movable therealong toward and away from said wheel, stator means supported from said member, operating means for moving said member along said nonrotating axle and thereby urging said stator means into engagement with said rotor means, and a torque arm on said member having slidable abutment with means on said frame, said operating means comprising a power device mounted on said member.

ALFRED H. OELKERS.